United States Patent [19]
Yasuda et al.

[11] 4,404,608
[45] Sep. 13, 1983

[54] MAGNETIC HEAD WITH AN IMPROVED INNER CORE

[75] Inventors: Isao Yasuda, Katano; Kazuaki Koyama, Hirakata; Yoshihiko Kawai, Moriguchi, all of Japan

[73] Assignee: Sanyo Electric Co., Ltd., Osaka, Japan

[21] Appl. No.: 231,321

[22] Filed: Feb. 4, 1981

[30] Foreign Application Priority Data

Feb. 4, 1980 [JP] Japan .................................. 55-12645
Apr. 16, 1980 [JP] Japan .................................. 55-50809

[51] Int. Cl.$^3$ ........................... G11B 5/12; G11B 5/22
[52] U.S. Cl. .................................. 360/126; 360/119; 360/125
[58] Field of Search ............... 360/126, 125, 127, 129, 360/119-121, 123

[56] References Cited

U.S. PATENT DOCUMENTS

| | | | |
|---|---|---|---|
| 3,303,292 | 2/1967 | Bedell, Jr. et al. | 360/125 |
| 4,115,827 | 9/1978 | Gooch | 360/125 |
| 4,217,613 | 8/1980 | Schwartz | 360/125 |
| 4,293,884 | 10/1981 | Schiller | 360/125 |

FOREIGN PATENT DOCUMENTS

| | | | |
|---|---|---|---|
| 53-108409 | 9/1978 | Japan | 360/125 |
| 55-64633 | 5/1980 | Japan | 360/125 |

*Primary Examiner*—Alfred H. Eddleman
*Attorney, Agent, or Firm*—Armstrong, Nikaido, Marmelstein & Kubovcik

[57] ABSTRACT

In a magnetic head including an inner core of metallic magnetizable material sandwiched between a pair of outer reinforcing cores each having a coil winding insertion opening formed in it, the inner core includes a first core block which has a front gap defining surface and a back or rear gap defining surface respectively provided at one side and the other side of the first core block and a coil winding recess provided in a position adjacent to the front gap defining surface, and which is formed, between the front gap defining surface and the coil winding recess, with a space or groove for setting the lower end of the front gap defining surface and a brazing material layer for connecting the space or groove with the coil winding recess, and a second core block to be combined with the first core block so as to constitute the inner core.

13 Claims, 17 Drawing Figures

MAGNETIC HEAD WITH AN IMPROVED INNER CORE

BACKGROUND OF THE INVENTION

The present invention generally relates to a magnetic head for use in magnetic recording and reproduction systems, for example, a video tape recorder and the like, and more particularly, to a magnetic head which can be applied to a high coercive tape such as the so-called metal tape, etc., of which coil force HC is more than 1000 Oe.

Generally, for recording video information and the like on a high coersive tape such as a metal tape at a high density, it is necessary to employ a metallic magnetizable material such as sendust alloy (Fe-Al-Si alloy) formed into a configuration to suit to a narrow track width, for example, of 10 to 30μ. For the above purpose, the magnetic head therefor generally has a thin inner sendust core sandwiched between outer reinforcing cores. More specifically, the conventional inner sendust core shown, for example, in FIG. 1 is produced through the steps of filling a bonding or brazing material m such as silver alloy or the like into part of a coil winding recess h at the side of a back or rear gap Bg and also into a brazing material filling groove U which are formed in one sendust core block Sa, fitting said one sendust core block Sa onto the other or counterpart sendust core block Sb for brazing or welding therebetween, and subjecting the sendust core blocks Sa and Sb thus combined to a predetermined machining such as slicing or the like so as to obtain core chips of required size. However, the magnetic head which includes the known inner core as in FIG. 1 constituted by brazing together the two sendust core blocks Sa and Sb each made of thin metallic magnetizable material of 10 to 30μ in thickness, only at the back gap side Sb thereof, with the coil winding recess h provided at its intermediate portion, has a problem in mechanical strength owing to absence of any junction at its front gap side Fg, this giving rise to a possibility that a positional deviation may take place at said front gap side in the course of the machining or during use. Meanwhile, even if it is attempted to increase the mechanical strength by increasing the region to be occupied by the brazing material m in the coil winding recess h, the output is undesirably reduced due to decrease of the coil winding region in the recess h.

It should be noted here that, in FIG. 1 and other figures referred to hereinbelow, although the edges at the front gap sides of the inner cores end of the magnetic heads constituted thereby, on which magnetic tapes are slidingly moved, are generally shown as squarish or angular for a schematic representation, such edges are, of course, curved into an arcuate configuration for smooth passage of the tapes in the actual products.

In order to overcome the disadvantages as described above, there has conventionally been proposed an arrangement in which the two core blocks are joined together by brazing material disposed at approximately equal intervals on the confronting faces or edges of said core blocks, but such as arrangement as described above, although favorable for maintaining a sufficient mechanical strength, tends to impair the reproduction output characteristics of magnetic head in high frequency region, since the junctions provided in the vicinity of the coil winding recess give rise to magnetic loss with respect to magnetic flux of short wave lengths in the video region.

In another known inner core, it is so arranged that brazing material filling grooves are provided in the first core block at its back gap and front gap sides, and also in a position between the back gap side and front gap side, while a coil winding recess is formed in the central groove after filling the brazing material into said brazing material filling grooves, and then, the first core block is brazed together with the second core block through gap distance defining layers formed on the front and back gap forming surfaces for subsequent machining of the inner core thus prepared into the predetermined shape. By the above known arrangement, although the mechanical strength may be improved owing to the provision of the junction also at the side of the front gap forming surface with respect to the coil winding recess, the magnetic characteristics of the resultant inner core show a marked deterioration at the high frequency region as shown in the dotted curve B in FIG. 8, which is attributable to the fact that the brazing material tends to flow into the diffusion prevention groove and coil winding groove during brazing to form a diffusion layer thereof to a large extent in the core block, thus adversely affecting the magnetic characteristics at the front gap portion.

SUMMARY OF THE INVENTION

Accordingly, an essential object of the present invention is to provide an improved inner core of a magnetic head which is capable of increasing mechanical strength at its front gap portion, with a sufficient coil winding region provided.

Another important object of the present invention is to provide an improved inner core of a magnetic head of the above described type which is capable of reducing passing loss of high frequency magnetic flux, while maintaining a sufficient mechanical strength, without deterioration of magnetic characteristics thereof.

A further object of the present invention is to provide an improved inner core of a magnetic head of the above described type which is simple in construction and stable in functioning at high reliability, and can be manufactured on a large scale at low cost.

In accomplishing these and other objects, according to one preferred embodiment of the present invention, there is provide a magnetic head including an inner core of metallic magnetizable material sandwiched between a pair of outer reinforcing cores each having a coil winding insertion opening formed therein, and the inner core comprises a first core block which has a front gap defining surface and a back gap defining surface respectively provided at one side and the other side of said first core block and a coil winding recess provided in a position adjacent to the front gap defining surface, and which is formed, between the front gap defining surface and the coil winding recess, with a space or groove for setting the lower end of the front gap defining surface and a brazing material layer for connecting the space or groove with the coil winding recess, and a second core block to be combined with the first core block so as to constitute the inner core.

By the arrangement according to the present invention as described above, a magnetic head having an improved inner core is advantageously presented, with substantial elimination of disadvantages inherent in the conventional magnetic heads of this kind.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
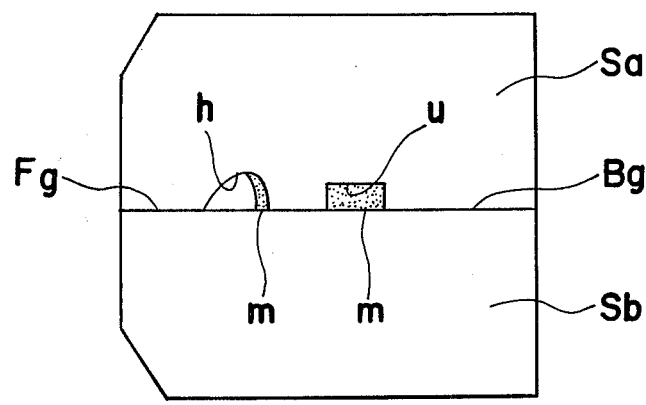
FIG. 1 is a schematic side elevational view of a conventional inner core of a magnetic head (already referred to)
Figure 2:
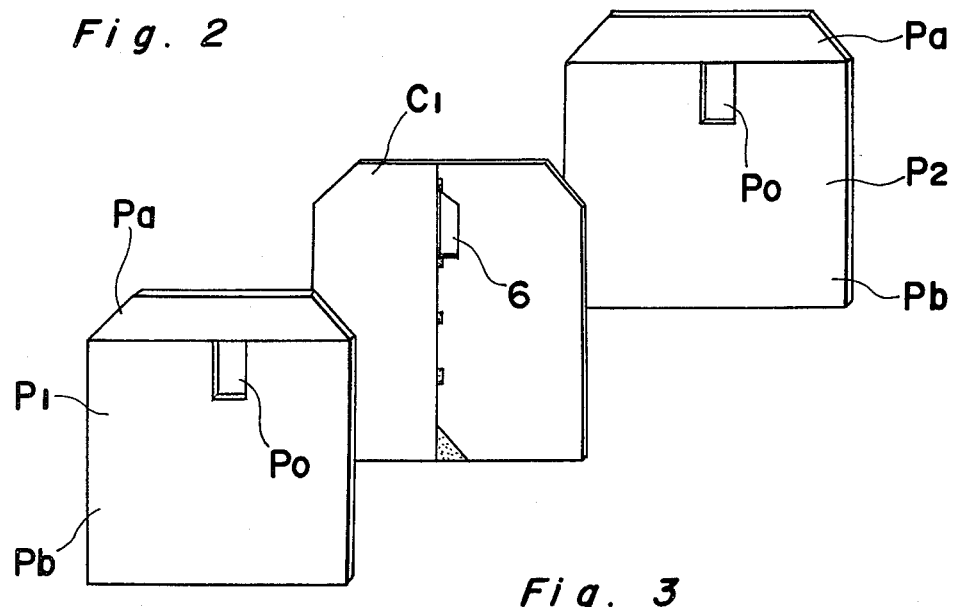
FIG. 2 is an exploded view showing the construction of a magnetic head to which an improved inner core according to the present invention may be applied.
Figure 3:
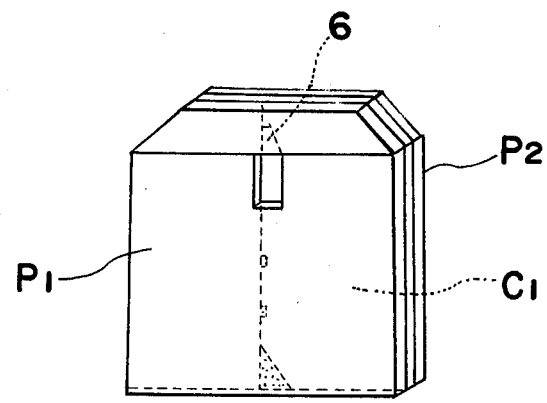
FIG. 3 is a perspective view of the magnetic head of FIG. 2 as assembled.

Referring now to the drawings, there is shown in FIGS. 2 and 3 the construction of a magnetic head to which an improved inner core directly related to the present invention may be applied. In FIGS. 2 and 3, the magnetic head generally includes the improved inner core according to the present invention, for example, a core C1 to be described in detail later with reference to FIG. 1 and sandwiched between side cores or reinforcing cores P1 and P2, each of which is constituted by a rectangular lower portion Pb, for example, of ferrite material suitably combined with an upper portion Pa of glass material and the like and formed with a coil winding insertion opening Po in a position corresponding to a coil winding opening 6 of the inner core C1 as shown.

Figure 4:
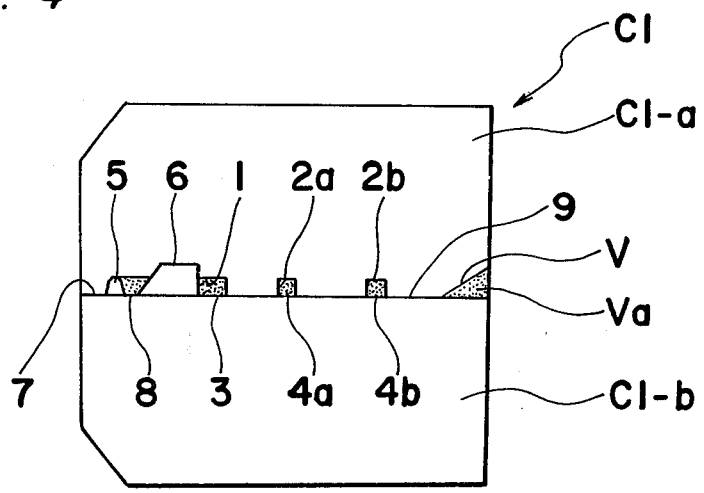
FIG. 4 is a schematic side elevational view of an improved core of a magnetic head according to one preferred embodiment of the present invention.
Figure 5:
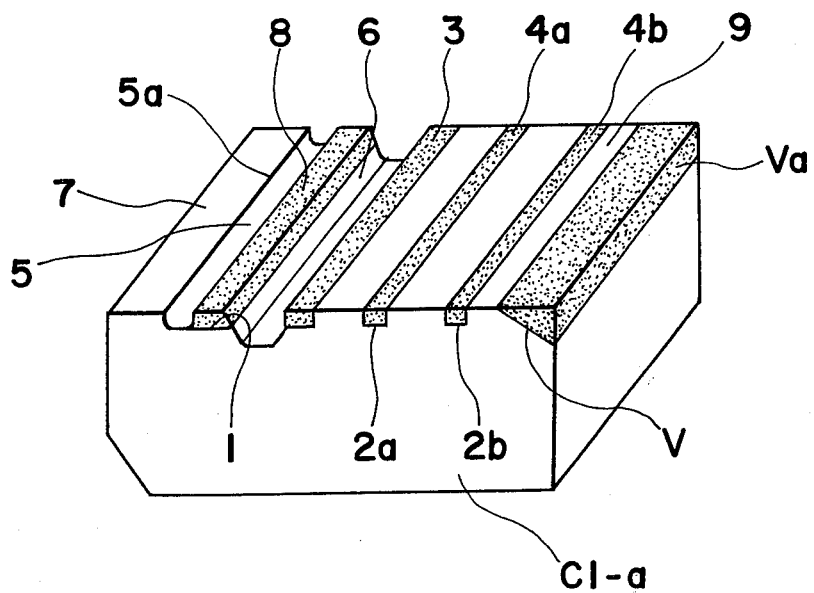
FIG. 5 is a perspective view showing on an enlarged scale, the structure of a core block employed in the inner core of FIG. 4, FIGS. 6(a) to 6(g) are schematic side elevational views, partly in section, explaining a process of manufacturing the improved inner core of FIG. 4.
Figure 6A:
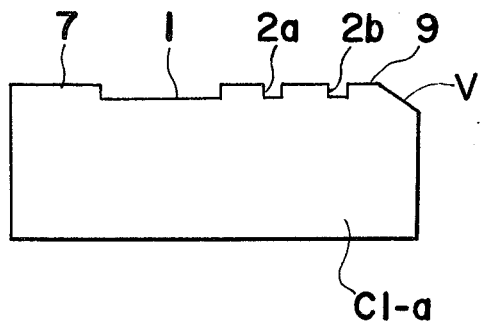
Figure 6E:
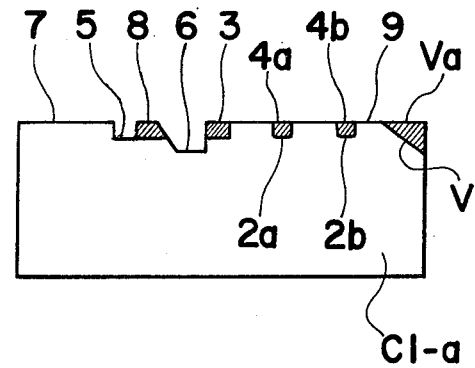
Figure 6B:
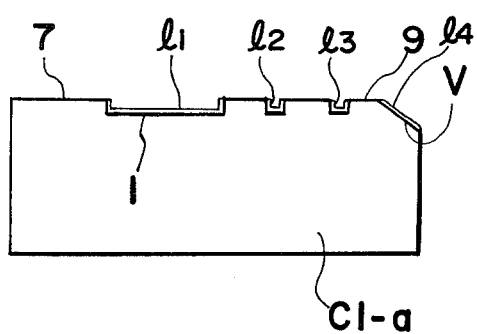
Figure 6F:
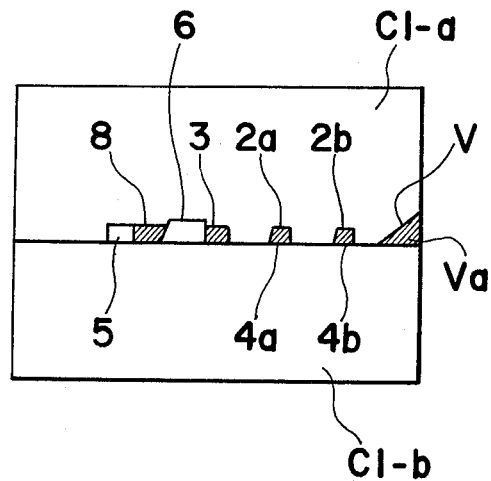
Figure 6C:
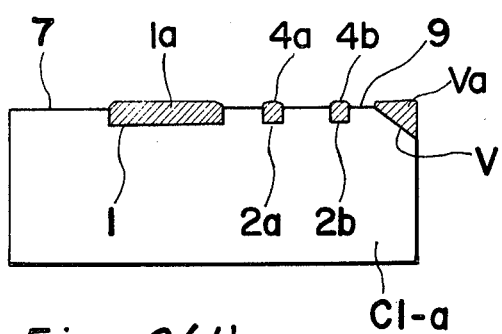
Figure 6G:
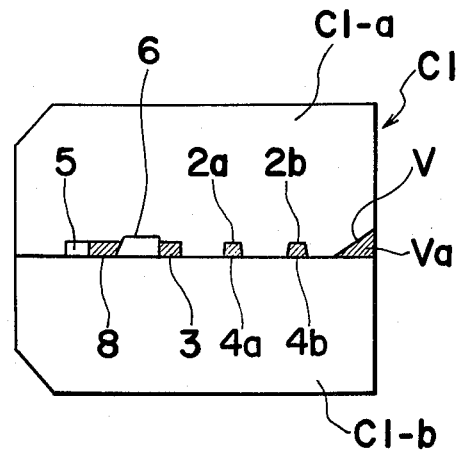
Figure 6D:
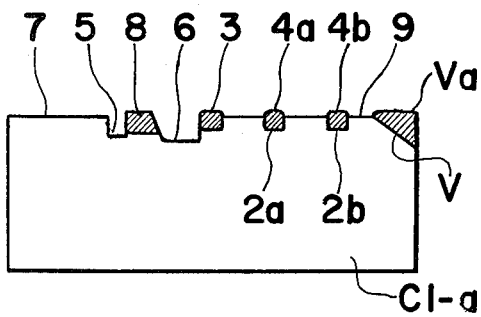

Referring particularly to FIGS. 4 to FIG. 6(g), the inner core C1 of FIG. 4 according to the present invention is produced by a process comprising the steps of firstly forming, in one surface of a sendust core block C1-a, a wide groove 1, a set of spaced narrow grooves 2a and 2b, and a bevelling V at the corner adjacent to a back gap defining side 9 of said core block C1-a for filling bonding or brazing material therein, which are provided in parallel relation to each other and extending over the entire width of the core block C1-a (FIG. 6(a)), subsequently forming, in the wide groove 1 provided adjacent to a front gap defining side 7 of the core block C1-a, in the set of spaced narrow grooves 2a and 2b, and on the bevelling V at the gap defining side 9, plated or deposited copper layers 11, 12, 13 and 14 each having a thickness of approximately more than 10μ (FIG. 6(b)), applying the brazing material onto the copper layers 11 to 14 as shown at 1a, 4a, 4b and Va (FIG. 6(c)), subsequently forming, in the wide groove 1, a brazing material diffusion preventing groove 5 and a coil winding recess 6 having a depth more than three times that of the groove 1 (FIG. 6(d)) so as to provide layers 8 and 3 of the brazing material between the groove 5 and one edge of the recess 6, and also at the other edge of said recess 6 respectively, polishing and flattering the surface of the core block C1-a thus processed (FIG. 6(e)), providing a spacer (not shown), for example, of SiO₂ on the front and back gap defining surfaces 7 and 9 for restricting the gap distance, brazing the core block C1-a thus prepared with a counterpart core block C1-b (FIG. 6(f)) to consititute the inner core, and subjecting said inner core to machining such as slicing for obtaining core chips of predetermined dimensions. (FIG. 6(g)).

It should be noted here that the brazing material diffusion preventing groove 5 defines, at its edge 5a (FIG. 5), the lower end of the front gap defining surface 7, and the width of said groove 5 which is formed, for example, by etching or the like with less processing strain is selected to be in such an extent that, during the brazing of the core block C1-a to the counterpart core block C1-b, the front gap defining surface 7 is not affected by the fused brazing material 8. More specifically, even when a diffusion layer (not shown) tends to be formed from the fused brazing material 8 towards the front gap defining surface 7 during the brazing, such a diffusion layer does not reach the surface 7 having a large influence on the magnetic characteristics by the presence of the groove 5, and thus, the deterioration in the magnetic characteristics is advantageously prevented.

It should also be noted that, in the embodiment of FIG. 4, since the brazing material layer 8 connects the core block C1-a with the mating core block C1-b at the side at the coil winding recess 6 adjacent to the front gap defining surface 7, the mechanical strength at said portion may be markedly improved. Furthermore, during the connection of the core blocks C1-a and C1-b, the layers of the brazing material 8 and 3 are fused to the corresponding portions of the core block C1-b without flowing into the coil winding recess 6, and therefore, said recess 6 is provided with a sufficient space, without reduction of the number of turns of the coil winding and without consequent reduction of the reproduction output.

It should further be noted that, although the manufacturing process of FIGS. 6(a) to 6(g) may be so modified that the brazing material is directly applied onto the portions to be formed with the brazing material layers such as 8, 3, 4a, 4b and Va for subsequent heating, the brazing material tends to be partially solidified into granular shape in that case due to poor wetting characteristics between said brazing material and the metallic magnetizable material (i.e. sendust) of the core blocks, with consequent difficulties in perfectly filling such portions. According to the process of FIGS. 6(a) to 6(g), since the copper layers 11 to 14 superior in wetting characteristics are preliminarily applied to the portions 8, 3, 4a, 4b and Va as described earlier, the brazing material placed on these copper layers 11 to 14 for melting is prevented from being formed into granular form by the copper layers so as to be uniformly fused in the directions in which said portions or grooves extend for perfect filling thereof.

Figure 7:
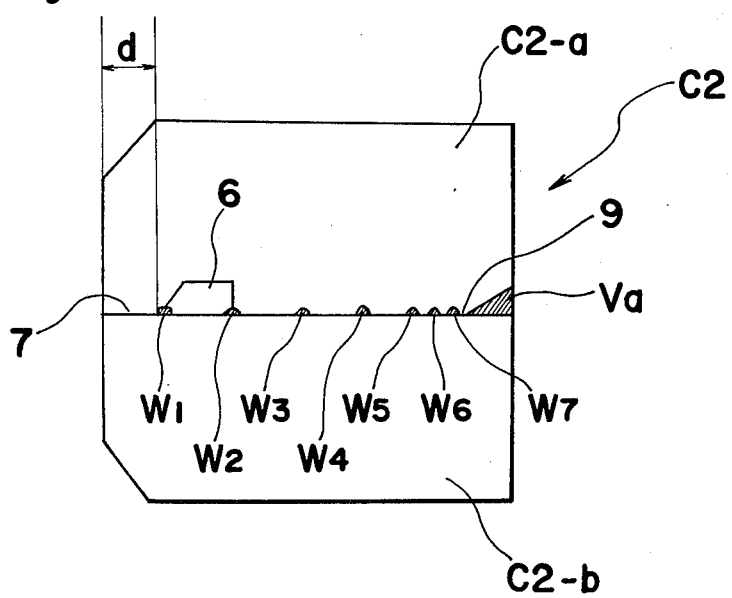
FIG. 7 is a view similar to FIG. 4, which particularly shows a modification thereof.

Referring to FIG. 7, there is shown a modification of the inner core C1 of FIG. 4. In the modified inner core C2 in FIG. 7, the grooves 5, 2a and 2b and the silver alloy brazing material layers 8, 3, 4a and 4b are replaced, for example by welding or brazing spots w1, w2, w3, w4, w5, w6 and w7 of silver alloy brazing material, provided between the core blocks C2-a and C2-b as shown, while the distribution of the brazing spots w1 to w7 is arranged to be sparse in the vicinity of the coil winding recess 6, and to be dense towards the bottom side of the back gap defining surface 9, with the ratio of the brazing spot intervals being, for example, 7:5:3:1:1 as viewed from the side of the brazing spot w2 at the lower portion of the recess 6. In this modification, the gap depth d is set to be 40μ and the gap length or distance between the confronting core blocks C2-a and C2-b is set at 0.3μ.

Figure 8:
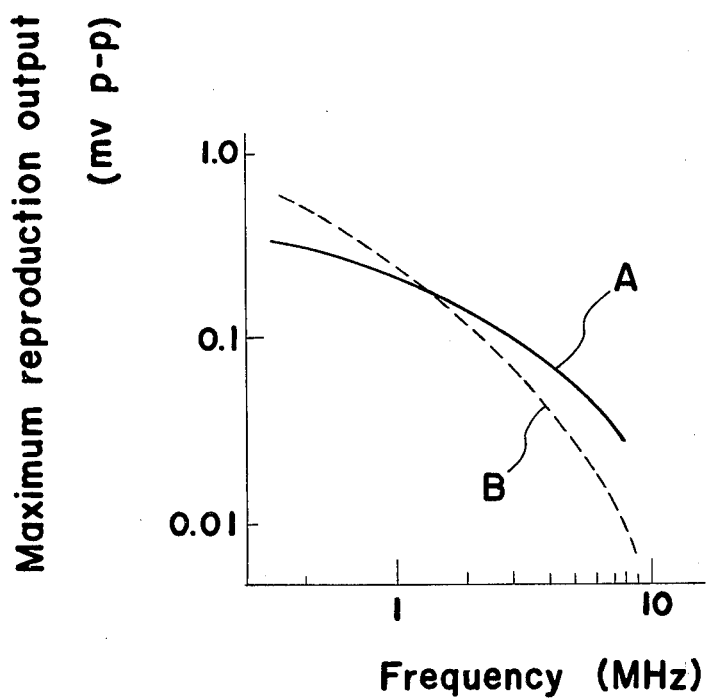
FIG. 8 is a graph showing the relation between the maximum reproduction output and frequencies with respect to the improved inner core of the magnetic head according to the present invention and the conventional inner core.

Referring also to FIG. 8 showing the relation between the maximum reproduction output and frequency characteristics with respect to the modified inner core C2 of FIG. 7 according to the present invention and the conventional inner core having the equal brazing spot interval ratio, it is seen that the characteristics of the inner core C2 of the present invention as represented by a solid line curve A are superior especially in the high frequency region as compared with those of the conventional inner core denoted by a dotted line curve B. The above superiority of the inner core C2 of the present invention is considered to be attributable to the fact that the magnetic loss due to the brazing spots present in the vicinity of the coil winding recess 6 as observed in the conventional inner core is reduced according to the arrangement of the present invention. Furthermore, as a result of a mechanical load resistance test carried out by the present inventors on the conventional inner cores and the inner core C2 according to the present invention, the inner core C2 of the present invention showed a larger resistance than the conventional inner cores partly due to the fact that the silver alloy brazing material is employed.

As is seen from the foregoing description, in the modified inner core C2 of FIG. 7, since the brazing spots for brazing together the core blocks C2-a and C2-b are arranged to be sparsely distributed in the vicinity of the coil winding recess and densely distributed at the bottom side of the back gap defining surface, the magnetic loss at the high region can be reduced, with consequent improvement of the high frequency region characteristics as shown by the solid curve A in FIG. 8 as well as that of the mechanical strength.

It is needless to say that, the mechanical strength of the inner core C1 of FIG. 4 may further be improved, if the brazing spots such as w5, w6 and w7 of FIG. 7 are further provided in the vicinity of the bottom side of the back gap defining surface 9 between the groove 2b and the bevelled portion V in the arrangement of FIG. 4.

Figure 9A:
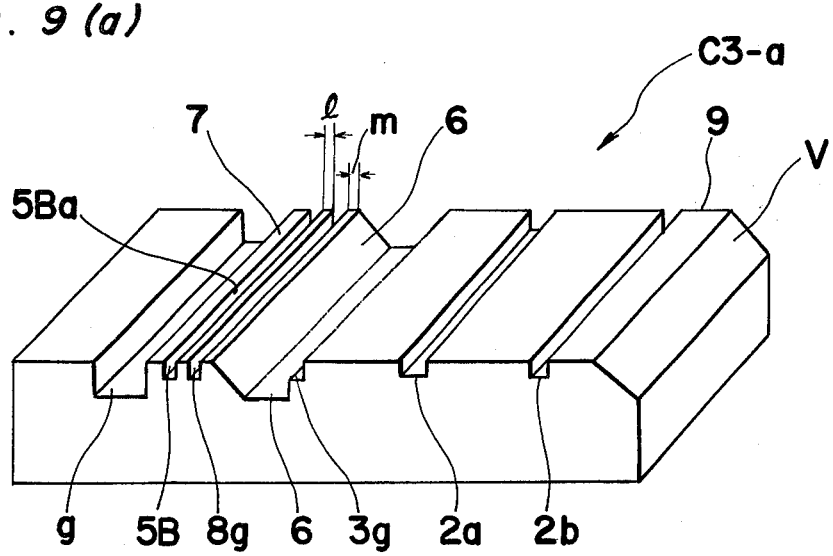
FIGS. 9(a) to 9(b) are perspective views explaining a process of manufacturing an inner core of FIG. 9(c) according to another modification of the present invention.
Figure 9B:
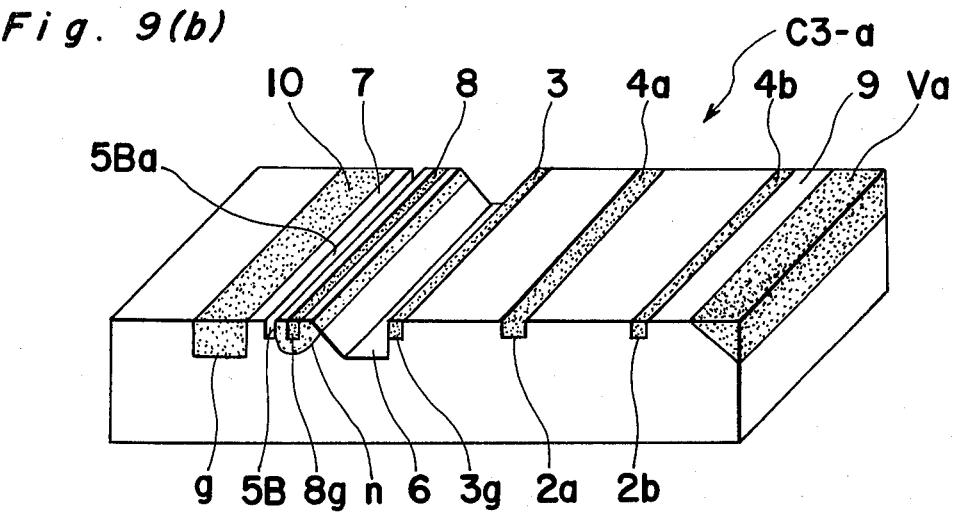
Figure 9C:
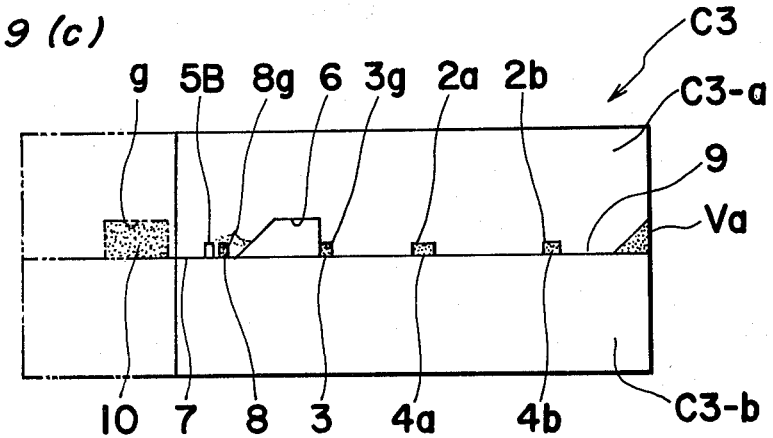
FIG. 9(c) is a schematic side elevational view of the improved inner core according to the another modification of the present invention.

Referring to FIGS. 9(a) to 9(c), there is shown a further modification of the inner core C1 of FIG. 4. In the modified inner core C3 in FIGS. 9(a) to 9(c), there are provided a first groove 5B formed in the surface of the core block C3-a between the front gap defining surface 7 and the coil winding recess 6 for setting said front gap defining surface, and a second groove 8g formed at the side of the coil winding recess 6 in a position spaced by a predetermined distance from said first groove 5B, and thus it is intended to prevent the deterioration of the characteristics by arranging so that the front gap portion is not magnetically affected by diffusion layer during brazing of the one set of core blocks C3-a and C3-b to each other by utilizing said second groove 8g, and simultaneously to increase the mechanical strength at the front gap side 7 by providing a brazed portion at said front gap side.

The modified inner core C3 of FIGS. 9(a) to 9(c) is produced generally in the similar manner as in the inner core C1 of FIG. 4, but in this modification, the brazing materials 8 and 3 are arranged to be filled in grooves 8g and 3g formed adjacent to the edges of the coil winding recess 6, while the brazing material diffusion preventing groove 5B, and a brazing material filling groove g in which the brazing material 10 is filled, are formed in parallel and spaced relation with respect to said groove 8g as shown.

The brazing material diffusion preventing groove 5B is the first groove which sets by its edge 5Ba, the lower end or depth end of the front gap defining surface 7 between the grooves g and 5B, while the groove 8g is the second groove which is formed in the core surface between the front gap defining surface 7 and coil winding recess 6 at a position spaced by a predetermined distance l from said first groove 5B so that the diffusion due to the brazing material 8 does not reach the front gap defining surface 7. The distance m between the second groove 8g and the one edge of the coil winding recess 6 is also set to be approximately equal to said distance l. In this modification, the above distance l and m are each arranged to be approximately 10 to 40μ.

During brazing of the core block C3-a prepared in the above described manner with the counterpart core block C3-b (FIG. 9(c)) and subsequent slicing of the core C3 thus produced into core chips of the required size, non-magnetizable layer n integral with the sendust core material due to the diffusion of the brazing material is formed in the regions between the groove 5B and second groove 8g and between the second groove 8g and coil winding recess 6, and thus, magnetic short-circuiting at the above regions is prevented. On the other hand, adverse effect to the front gap defining surface 7 due to the diffusion is perfectly eliminated by the first groove 5B serving for the preventing of such diffusion, while there is not any possibility that the silver alloy blazing material flows into the coil winding recess 6. Accordingly, in the arrangement of FIGS. 9(a) to 9(c), the deterioration in the magnetic characteristics due to the diffusion layer is advantageously prevented, and the improvement of the characteristics at the high frequency region as represented by the curve B in FIG. 8 referred to earlier has been achieved.

After completion of the inner core C3, one end portion thereof including said groove g is cut off during the machining as shown by a chain line in FIG. 9(c) at a position adjacent to the front gap defining surface 7.

As is clear from the foregoing description, in the inner core C3 of FIGS. 9(a) to 9(c), since the core block C3-a is arranged to be secured to the counterpart core block C3-b at the side of the front gap defining surface of the coil winding recess, there is no possibility of opening or deviation in the gap due to warping or curving of the inner core, even when the core is formed into very thin core chips, with a sufficient mechanical stability, while the adverse effect due to diffusion of the brazing material is eliminated by preventing entry of the brazing material onto the front gap defining surface from the second groove through provision of the first or brazing material diffusion preventing groove which sets the lower end of said front gap defining surface, and thus, the undesirable deterioration of the magnetic characteristics has also been prevented.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A magnetic head including an inner core of metallic magnetizable material sandwiched between a pair of outer reinforcing cores, each having a coil winding insertion opening formed therein, said inner core comprising a first core block which has a front gap defining surface and a back gap defining surface respectively provided at one side and the other side of said first core block and a coil winding recess provided in a position adjacent to said front gap defining surface, and which is formed, between said front gap defining surface and said coil winding recess, with a space for setting the lower end of said front gap defining surface and a brazing material layer connecting said space with said coil winding recess, and a second core block to be combined with said first core block so as to constitute said inner core, each of the reinforcing cores corresponding to the required size and shape of the inner core, as produced by machining, and being arranged, in a perspective view of the magnetic head as assembled, to be contactable with the inner core of magnetizable material so as to sandwich the front gap of the inner core therebetween with mechanical strength and for providing a stable magnetic head with high reliability.

2. A magnetic head as claimed in claim 1, wherein said metallic magnetizable material of said inner core is Fe-A-Si alloy, and the portion of the reinforcing cores adjacent to the front gap of the inner core is constituted of glass without deteriorating the magnetic characteristics of the inner core at the front gap portion, while preventing positional deviation of the front gap of the first and second core blocks constituting the inner core within the front gap defining surface in the course of machining or during use.

3. A magnetic head as claimed in claim 1, wherein said space is a brazing material diffusion preventing groove formed in said first core block in a position adjacent to one edge of said coil winding recess at the side of said front gap defining surface.

4. A magnetic head as claimed in claim 3, wherein said coil winding recess has a depth more than three times that of said brazing material diffusion preventing groove.

5. A magnetic head as claimed in claim 3, wherein said first core block further includes layers of brazing material respectively formed between said brazing material diffusion preventing groove and the one edge of said coil winding recess, provided adjacent to the other edge of said coil winding recess, provided in a set of another grooves formed between said the other edge of said coil winding recess and said back gap defining surface, and also provided on a bevelled portion at the corner of said first core block at the side of said back gap defining surface.

6. A magnetic head as claimed in claim 5, wherein said brazing material layers provided in said set of another grooves are densely distributed towards the bottom side of said back gap defining surface as compared with the brazing material layers sparsely distributed in the vicinity of said coil winding recess.

7. A magnetic head as claimed in claim 1, wherein said space is a first groove for preventing diffusion of brazing material towards said front gap defining surface, formed in said first core block in a position in the vicinity of one edge of said coil winding recess, said first core block further including a second groove formed between said first groove and the one edge of said coil winding recess in a position spaced by a predetermined distance from said first groove.

8. A magnetic head as claimed in claim 7, wherein said second groove is spaced from the one edge of said coil winding recess by a predetermined distance approximately equal to said predetermined distance by which said second groove is spaced from said first groove.

9. A magnetic head as claimed in claim 8, wherein said first core block further includes layers of brazing material respectively provided in a further groove formed adjacent to said first groove at the side of said front gap defining surface, provided adjacent to the other edge of said coil winding recess, provided in a set of still another grooves formed between said the other edge of said coil winding recess and said back gap defining surface, and also provided on a bevelled portion at the corner of said first core block at the side of said back gap defining surface.

10. A magnetic head as claimed in claim 9, wherein said brazing material layers provided in said set of still another grooves are densely distributed towards the bottom side of said back gap defining surface as compared with the brazing material layers sparsely distributed in the vicinity of said coil winding recess.

11. A magnetic head including an inner core of metallic magnetizable material sandwiched between a pair of reinforcing cores each having a coil winding insertion opening formed therein, said inner core comprising a first core block which has a front gap defining surface and a back gap defining surface respectively provided at one and the other sides of said first core block and a coil winding recess provided in a position adjacent to said front gap defining surface, and a second core block to be combined with said first core block so as to constitute said inner core, said first and second core blocks being provided, between confronting surfaces thereof, with a number of brazing spots of brazing material, said brazing spots being distributed, from said coil winding recess to said back gap defining surface, more sparsely in the vicinity of said coil winding recess and more densely in the vicinity of said back gap defining surface in the intervals between said brazing spots.

12. A magnetic head as claimed in claim 11, wherein said brazing spots are arranged, from one of said spots at the lower edge of said coil winding recess towards the bottom side of said back gap defining surface, to be distributed at brazing spot interval ratio of 7:5:3:1:1.

13. A magnetic head as claimed in claim 11, wherein said brazing spots are of silver alloy brazing material.

* * * * *